Aug. 2, 1927.
K. R. KNOFE
1,637,946
METHOD OF MAKING IMITATION MARBLE
Filed Feb. 27, 1926
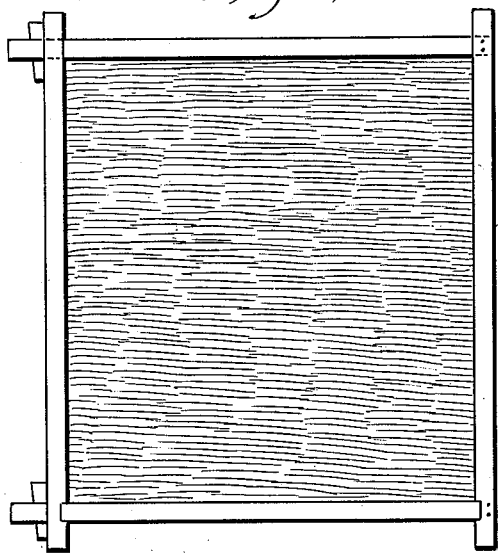
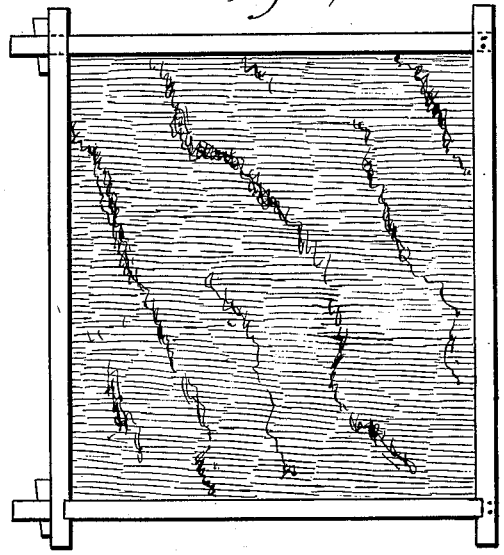
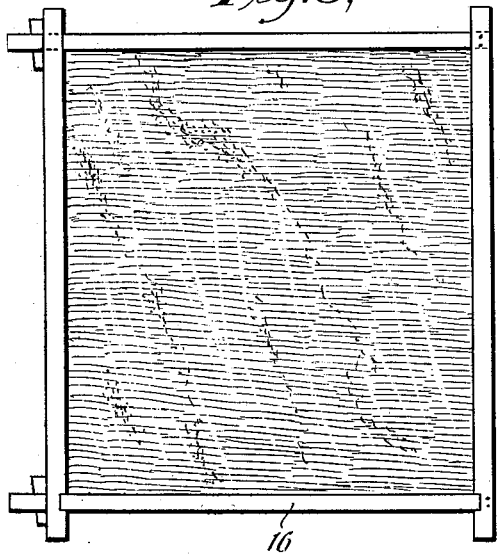
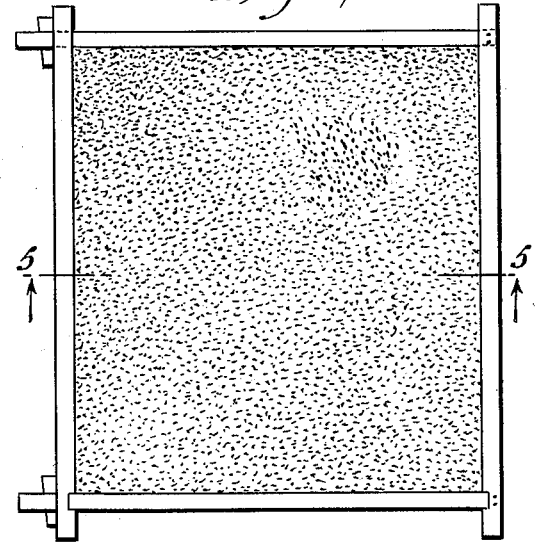
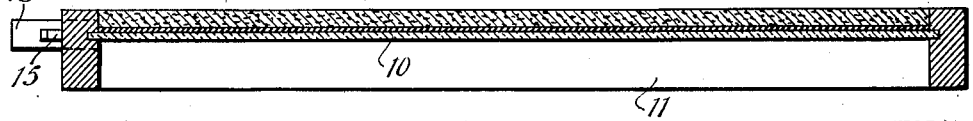
WITNESSES
INVENTOR
Karl Rudolf Knofe
BY
ATTORNEYS Patented Aug. 2, 1927.

1,637,946

UNITED STATES PATENT OFFICE.

KARL RUDOLF KNOFE, OF DRESDEN, GERMANY, ASSIGNOR, BY DIRECT AND MESNE ASSIGNMENTS, OF ONE-HALF TO TRYGVE MAMEN AND ONE-HALF TO JOHN EDWARDS, BOTH OF BROOKLYN, NEW YORK.

METHOD OF MAKING IMITATION MARBLE.

Application filed February 27, 1926. Serial No. 91,119½.

This invention relates to a method of making imitation marble.

An object of the invention is to provide a method which is simpler, quicker, more economical and produces a more finished and beautiful product than anything hitherto attempted. The invention is illustrated in the drawings of which Figure 1 is a plan view of the mold showing the surface coat applied to the bottom of the mold;

Figure 2 is a plan view of the same mold showing the veining material applied on top of the surface coat.

Figure 3 is a similar view showing the preconcreting layer applied to the mold.

Figure 4 is a similar view showing the main concreting layer disposed in the mold.

Figure 5 is a section taken on the line 5—5 of Figure 4.

Figure 6 is an end view of the mold showing a construction which permits the admission of air between the bottom of the mold and the molded article to facilitate the drying out of the article before being removed from the mold.

The form of the invention shown in the drawings is a preferred form, although it is understood that modifications in the construction and arrangement of the parts and in the character of the materials used may be adopted without departing from the spirit of the invention as set forth in the appended claims.

In its general aspect the method of making imitation marble comprises providing a mold having a glass bottom. The first step in the process comprises painting on to the surface of the glass a layer of paint mixture of desired color to form a first coat. The second step comprises applying a veining layer immediately on top of the first coat, said veining layer being applied in the form of a more or less viscous paint of the desired color and in a manner to produce the effect of veins showing through the first coat on to the surface of the glass.

The third step comprises the introduction into the mold of a preconcreting mixture which is a rather viscous mixture of high-grade concrete. This preconcreting mixture is thrown into the mold with considerable force, either by means of a cement gun, by means of a brush or by hand. The effect of throwing in this preconcreting mixture is to spread the color previously applied and to so alter the arrangement of the veining as to give it a very artistic and natural appearance. In addition, portions of this preconcreting mixture itself may be forced through the two previously applied coats to appear on the surface.

The fourth step in the process comprises adding a more substantial layer of heavier concrete to form the main body of the slab or block.

The fifth step comprises the placing of the mold with the block in an apparatus in which it is subjected to drying heat for about twenty-four hours.

The sixth step is the removal of the block from the mold and allowing it to dry in the air for two days.

The seventh step is the impregnation of the block with water proofing liquid solution and then leaving it in the air to dry for one day.

As an example of the process, we explain the process following to produce a slab with a dark green toning and black and white veining of a size about ten feet square and seven-eighths of an inch thick.

The first coat is prepared by mixing 7 ounces of white cement and about ¼ ounce of dark green cement color. To this mixture, and all other mixtures used is added a sufficient amount of a chemical solution to give the desired consistency to each of the chemicals referred to. This chemical solution is made by mixing 7½ quarts of warm water, 5½ ounces of cracetol (casein) and ½ ounce of sal ammoniac. Having then mixed the white cement and the dark green color together, we add enough of the chemical solution to give the required consistency, after which the first coating is painted on the top of the glass bottom 10 of the mold frame 11 with a brush.

The next mixture, which is called the black veining mixture, comprises ½ ounce of black cement color and 1 ounce of white cement, to which is added a sufficient amount of the chemical solution to give the desired consistency. This black veining is then applied to the previous coat of paint by means of a brush and in any desired artistic manner in accordance with the skill of the workman to lay out the veins on the first coat.

The next coating is the white vein coating and is laid on in exactly the same manner by means of a brush and comprises a mixture of ¾ of an ounce of white cement color, ⅛ ounce of blue cement color and 1 ounce of white cement, to which has been added the requisite amount of the chemical solution.

The next step comprises the addition of a preconcreting mixture which is thrown in by hand or by any mechanical means with considerable force against the previously applied coatings and preferably before they have had an opportunity to dry out. This preconcreting mixture comprises 5½ pounds of white cement, 11 pounds of white siliceous sand and 1½ ounces of dark green cement color to which has been added the requisite amount of the chemical solution.

The next step comprises the addition of a main body layer of concrete comprising one part of ordinary grey cement and three parts of ordinary sand to which has been added the requisite amount of the chemical solution. This main layer of concrete can be merely poured in to the required depth.

Each of these mixtures must be thoroughly stirred in order to get the colors thoroughly incorporated with the sand and the cement, after which, in each case, the solution is added with constant stirring.

After these layers are added the mold is placed on a heating table to be dried, which generally takes about two days. It can be dried by leaving it in the air without subjecting it to heat, but this would take eight or ten days. When the slab is removed from the mold it is already polished and glazed and is left for two days in the air without touching it. It is then treated with a special water-proofing solution and allowed to dry for a day, after which it is ready for use.

The colors used should be genuine cement colors, preferably earthen colors. The sand should be sharp, strongly siliceous, white and clean.

In the drawings, in Figure 6, the end wall 12 has a reduced portion 13 projecting through the side wall 14 and a tapered wedge pin 15 is used to lock the two together. The end wall 12 is provided with a top piece 16 which can be removed therefrom. This detachable mold piece when removed will expose the end of the slab and allow the air to get in between the surface of the slab and the glass bottom of the mold.

This process, as it will be obvious, is extremely simple, requires a very short time to complete it and the slabs can be inserted in the mold by hand in a few minutes. The most natural colors and veining effects are produced. The material is strong and durable and can be made at a much reduced price. The product chiefly comprises sand, cement, colors and chemicals. The article is free from pores, waterproof and can be easily drilled, more so than natural marble.

What I claim is:

1. A method of making imitation marble which comprises forming a mold with a glass bottom, coating the bottom of the mold in colors, applying a layer of different colors to produce veining on the coating, throwing in a preconcreting mixture with considerable force to spread the veins and the colors and then pouring in a body layer of concrete drying the product in the mold for about twenty-four hours under heat and then removing the product from the mold and drying it in the air for two days, then impregnating the product with a water-proofing solution and then allowing it to dry for one day.

2. A method of making imitation marble, consisting in applying a coating of cement colored dark green to the glass bottom of a mold, applying a coating of cement with which is mixed white and black coloring materials to the first coating, applying a coating of cement colored blue, throwing in a mixture of cement colored dark green upon the coatings while they are wet, pouring ordinary gray cement upon the green colored cement, subjecting the whole to the action of heat to dry the same, removing the mass and allowing it to dry in the air, and impregnating the mass with a water-proof solution.

3. The herein described method of making imitation marble, consisting in applying a mixture of white cement, and a dark green coloring substance to the glass bottom of a mold, applying a mixture of white cement and a black coloring substance upon the first mixture, applying a mixture of white cement and a blue coloring substance upon the second mixture, applying a mixture of white cement, white siliceous sand and a dark green coloring substance upon the third mixture, applying a mixture of ordinary gray cement and sand upon the fourth mixture each of the mixtures containing cracetol and ammonia, subjecting the whole to the action of heat, removing the mass and allowing it to dry, and impregnating the mass with a water-proof solution.

KARL RUDOLF KNOFE.